United States Patent
Fujiwara et al.

(10) Patent No.: US 8,415,263 B2
(45) Date of Patent: *Apr. 9, 2013

(54) COMPOSITE MATERIAL USING STRETCHABLE NONWOVEN FABRIC

(75) Inventors: Toshikatsu Fujiwara, Shiga (JP); Taiju Terakawa, Shiga (JP)

(73) Assignees: JNC Corporation, Tokyo (JP); JNC Fibers Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,633

(22) Filed: Mar. 30, 2011

(65) Prior Publication Data

US 2011/0244749 A1    Oct. 6, 2011

(30) Foreign Application Priority Data

Apr. 6, 2010 (JP) .................................. 2010-87920

(51) Int. Cl.
| | |
|---|---|
| *D04H 3/16* | (2006.01) |
| *D04H 1/06* | (2012.01) |
| *D04H 1/10* | (2006.01) |
| *D04H 1/22* | (2006.01) |
| *D04H 1/54* | (2012.01) |
| *D04H 3/12* | (2006.01) |
| *D04H 3/14* | (2012.01) |
| *B32B 5/26* | (2006.01) |
| *B32B 3/06* | (2006.01) |
| *B32B 3/28* | (2006.01) |
| *B32B 3/30* | (2006.01) |
| *D03D 3/08* | (2006.01) |

(52) U.S. Cl. ........ 442/401; 442/327; 442/328; 442/329; 442/333; 442/352; 442/361; 442/362; 442/363; 442/364; 442/382; 442/394; 442/400; 442/409; 428/103; 428/176; 428/194; 428/195.1; 428/373; 428/374; 428/152; 428/167; 428/196; 428/198; 428/174; 428/179; 428/181; 428/182; 428/183; 428/184; 428/185; 428/186

(58) Field of Classification Search ................... 442/327, 442/328, 329, 333, 352, 361, 362, 363, 364, 442/382, 394, 400, 401, 409; 428/103, 176, 428/194, 195.1, 373, 374, 152, 167, 196, 428/198, 174, 179, 181, 182, 183, 184, 185, 428/186

See application file for complete search history.

(56) References Cited

U.S. PATENT DOCUMENTS 5,102,724 A * 4/1992 Okawahara et al. .......... 442/199
5,840,633 A * 11/1998 Kurihara et al. .............. 442/200

(Continued)

FOREIGN PATENT DOCUMENTS

JP    1995-54256    2/1995
JP    08-188952 A  *  7/1996

(Continued)

*Primary Examiner* — David Sample
*Assistant Examiner* — Nicole T Gugliotta
(74) *Attorney, Agent, or Firm* — J.C. Patents

(57) ABSTRACT

A composite material as a sheet material is described, being relatively cheap, most useful as a raw material of a sanitary product or the like, such as underwear, dust-proof mask or dispensable paper diaper, etc., and good in processability, stretchability, gas-permeability, softness, and touch. The composite material is formed by laminating a stretchable layer and a conjugate spunbonded nonwoven fabric including conjugate fibers including a low-melting-point component and a high-melting-point component. The conjugate fibers are partially bonded to each other by thermocompression, wherein each bonded portion has fine folded structures including alternate hill and valley regions in the CD, and the distance between neighboring hills is 100-400 μm in average. The conjugate spunbonded nonwoven fabric exhibits stretchability through the spread of the fine folded structures, and has, at 5% elongation, a CD-strength of 0.1 N/5 cm or less and an MD/CD strength ratio of 200 or more.

8 Claims, 6 Drawing Sheets

U.S. PATENT DOCUMENTS

| | | | |
|---|---|---|---|
| 6,586,076 B1* | 7/2003 | Mizutani et al. | 428/173 |
| 6,632,212 B1* | 10/2003 | Morman et al. | 604/385.22 |
| 2002/0039637 A1* | 4/2002 | Meece et al. | 428/103 |
| 2003/0023807 A1* | 1/2003 | Yamamoto et al. | 711/112 |
| 2003/0096548 A1* | 5/2003 | Groitzsch et al. | 442/268 |
| 2005/0095943 A1* | 5/2005 | Griffin et al. | 442/352 |
| 2006/0121811 A1* | 6/2006 | Mangold et al. | 442/392 |
| 2010/0086745 A1* | 4/2010 | Ito et al. | 428/176 |
| 2010/0324515 A1* | 12/2010 | Boscolo | 604/367 |

FOREIGN PATENT DOCUMENTS

| | | |
|---|---|---|
| JP | 2004-76178 | 3/2004 |
| JP | 2004-521775 | 7/2004 |

\* cited by examiner

Arrangement pattern

Pattern of one column of thermocompression bonded portions

Arrangement pattern

Pattern of one column of thermocompression bonded portions

Pattern of two column of thermocompression bonded portions

Arrangement pattern

Pattern of two columns of
thermocompression bonded portions

Arrangement pattern

Pattern of thermocompression
bonded portions

COMPOSITE MATERIAL USING STRETCHABLE NONWOVEN FABRIC

CROSS-REFERENCE TO RELATED APPLICATION

This application claims the priority benefits of Japan patent application serial no. 2010-87920, filed on Apr. 6, 2010. The entirety of the above-mentioned patent applications is hereby incorporated by reference herein and made a part of specification.

BACKGROUND OF THE INVENTION

1. Field of Invention

This invention relates to a composite material formed by laminating a nonwoven fabric with a low-stress stretchability in one direction and a stretchable layer as an integral. With the lamination of a specific nonwoven fabric with a low-stress stretchability and a stretchable layer as an integral, the composite material advantageously serves as a sheet material that is most useful as a raw material of a sanitary product or the like, such as underwear, dust-proof mask, or dispensable paper diaper etc., is good in processability, stretchability, gas-permeability, softness, and touch, and is difficult to break, i.e., has a high breaking strength.

2. Description of Related Art

Ordinary spunbonded nonwoven fabrics and thermo-bonded nonwoven fabrics are cheap and widely used as general nonwoven fabrics convenient to use, but almost do not have low-stress stretchability. Though the spunlace nonwoven fabric as a general nonwoven fabric exhibiting low-stress stretchability is now available, its stretchability is not as good as defined in this invention and its cost is relatively high for the characteristic fabricating process. Nonwoven fabrics of low-stress stretchability also include tow-opened nonwoven fabrics with nearly parallel filaments and foam nets obtained by melt extrusion, but they are extremely small in the strength in the cross direction (CD, the width direction in the fabrication of the nonwoven fabric) and cannot meet the requirements of this invention. To solve these problems, some methods have been proposed in the following patent documents.

Patent Document 1 (Japanese Patent Publication no. 1995-54256) describes a laminate of two layers with different shrinkages to form folds on one of the two layers, but the folds are not stretched under a tensile stress.

Patent Document 2 (Japanese Patent Publication no. 2004-521775) describes a neck-stretched nonwoven web, but describes the surface of the nonwoven web to be "flat" and describes formation of folds on the surface of the film laminated with the nonwoven web in accompany with the CD-width reduction of the nonwoven web, which is simply called "width reduction" hereinafter.

Patent Document 3 (Japanese Patent Publication no. 2004-76178) describes using a gear roll to form folds on a nonwoven fabric, but the folds are formed all over the nonwoven fabric with relative large heights and wave lengths that are 2-30 mm and 2-50 mm, respectively.

However, with the above methods, the nonwoven fabric is not soft when being made from multiple layers, or does not have sufficient stretchability; therefore it cannot be the most suitable raw material for a product like underwear or a sanitary product.

SUMMARY OF THE INVENTION

Accordingly, this invention provides a composite material formed by laminating a non-woven fabric of low-stress stretchability that is relatively cheap and convenient to use.

This invention requires, as a raw material, a conjugate spunbonded nonwoven fabric that includes conjugate fibers including a low melting point (low-mp) component and a high-mp component and is partially subjected to moderate thermocompression bonding. Moreover, by stretching the raw-material nonwoven fabric in the length direction (machine direction, MD) in the fabrication of the nonwoven fabric under a predetermined condition, fine folded structures including alternate hill regions and valley regions are formed in the width direction (CD) in the thermocompression bonded portions. The nonwoven fabric exhibits stretchability through spread of the fine folded structures, so that the composite material of this invention formed by laminating the same with a stretchable layer as an integral has sufficient stretchability.

More specifically, this invention includes the following items.

The $1^{st}$ item is a composite material formed by steps comprising laminating a conjugate spunbonded nonwoven fabric and a stretchable layer as an integral. The spunbonded nonwoven fabric comprises conjugate fibers including a low-mp component and a high-mp component. The conjugate fibers are partially bonded to each other with thermocompression, wherein a thermocompression bonded portion includes fine folded structures including alternate hill regions and valley regions in the CD (width direction in the fabrication of the nonwoven fabric), and the distance between neighboring hill regions is 100-400 μm in average. The conjugate spunbonded nonwoven fabric exhibits stretchability through the spread of the fine folded structures.

The $2^{nd}$ item is a composite material of the $1^{st}$ item, wherein the conjugate spunbonded nonwoven fabric has, at 5% elongation, a CD-strength of 0.1 N/5 cm or less and an MD/CD strength ratio (the ratio of the strength in the length direction (MD) in the fabrication of the nonwoven fabric to the CD-strength) of 200 or more.

The $3^{rd}$ item is a composite material of the $1^{st}$ item, wherein the conjugate spunbonded nonwoven fabric has a CD-strength of 5 N/5 cm or less at 50% elongation.

The $4^{th}$ item is a composite material of any of the $1^{st}$ to $3^{rd}$ items, wherein the stretchable layer comprises a layer of continuous fibers that comprises an elastomeric resin.

The $5^{th}$ item is a composite material of the $4^{th}$ item, wherein the layer of continuous fibers comprises a layer of meltblown fibers.

The $6^{th}$ item is a composite material of any of the $1^{st}$ to $5^{th}$ items, wherein the lamination comprises partially bonding the conjugate spunbonded nonwoven fabric and the stretchable layer with thermocompression.

Effect of Invention

With this invention, a composite material as a sheet material is provided, being relatively cheap, most useful as a raw material of a sanitary product or the like, such as underwear, dust-proof mask, or dispensable paper diaper etc., and good in processability, stretchability, gas-permeability, softness, and touch. Articles using such composite materials can also be provided.

In order to make the aforementioned and other objects, features and advantages of this invention comprehensible, a preferred embodiment accompanied with figures is described in detail below.

DESCRIPTION OF EMBODIMENTS

In the fabrication of the spunbonded nonwoven fabric having good low-stress stretchability and being suitable for the composite material of this invention, it is preferred that the raw-material nonwoven fabric before the formation of the folded structures in the thermocompression bonded portions is a conjugate spunbonded nonwoven fabric that has a moderate dry-heat shrinkage ratio in the MD and keeps a residual fibrous structure of the high-mp component in the thermocompression bonded portions. In such a case, as long as the high-mp component keeps the fibrous shape in the thermocompression bonded portions, the low-mp component may be unified all over the thermocompression bonded portion through thermal melting. By heat-stretching the raw-material nonwoven fabric in the MD (the raw-material nonwoven fabric is preferably a conjugate spunbonded nonwoven fabric of conjugate fibers to facilitate such stretching), filaments of the conjugate fibers randomly arranged in the non-thermocompression bonded portion are moved to be aligned in the MD, which adversely causes the nonwoven fabric to have an inward stress in the CD so that the width in the CD is reduced. At the moment, though the thermocompression bonded portions have a tensile stress in the MD, the MD alignment of the filaments in the non-thermocompression bonded portions dominates and the thermo-compression bonded portions are neither stretched in the same stretching factor nor damaged. Moreover, though the thermocompression bonded portions also have inward stress in the CD, the remaining strain stress due to the absence of corresponding MD-stretching causes a stress relaxation, in which folded structures are formed in the CD. Further, since the fibrous structure of the high-mp component having heat-shrinkability remains in the thermocompression bonded portion, fine folded structures are easy to form due to the synergistic effect with the shrinkability.

Differently, when the raw-material nonwoven fabric is a spunbonded nonwoven fabric consisting of fibers of a single component, the fibers in the thermocompression bonded portions have to be almost completely melted and solidified to retain sufficient strength. When such spunbonded non-woven fabric is being stretched, although the non-thermocompression bonded portions are affected as above, the thermocompression bonded portions are stiffer than those in this invention and sufficient folded structures cannot be obtained. Moreover, even when a conjugate spunbonded nonwoven fabric of conjugate fibers is used as a raw material, the above problem is still present if the high-mp component in the thermocompression bonded portions is also melted and solidified.

Figure 1A:
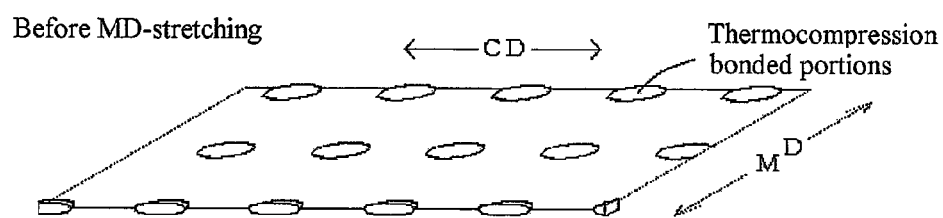
FIGS. 1(A)-1(B) illustrate the fine folded structures in the thermocompression bonded portions of the spunbonded nonwoven fabric used in this invention.
Figure 1B:
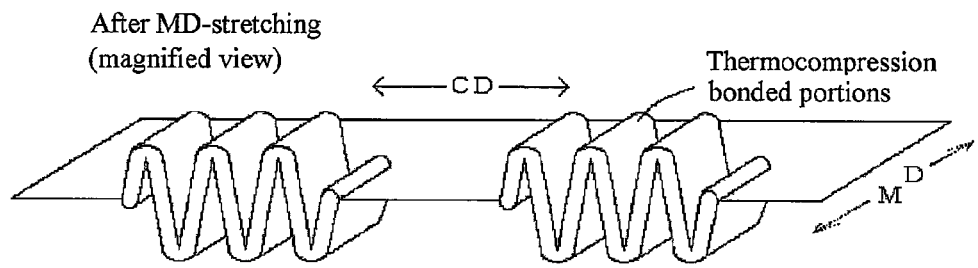

The fine folded structures in the thermocompression bonded portions of the conjugate spunbonded nonwoven fabric for forming the composite material of this invention are shown in FIG. 1(A)/(B). In the thermocompression bonded portions, two neighboring folded structures may be in contact with each other or separate from each other. The distance between neighboring hills or valleys of two neighboring folded structures depends on the physical properties or fiber structure of the raw-material nonwoven fabric and the stretching conditions, especially on the state of the thermocompression bonded portions of the nonwoven fabric. To achieve the object of this invention, the distance between neighboring hills of the folded structures in the thermocompression bonded portions is 100-400 μm, preferably 100-300 μm. When the distance between neighboring hills is 100-400 μm, sufficient stretchability is obtained, even without using a raw-material nonwoven fabric of a low basis weight in a required amount or more. Thus, it is easy to perform the thermal stretching uniformly and keep uniform low-stress stretchability.

The conjugate spunbonded nonwoven fabric used in this invention exhibits stretchability under an extremely low stress in the CD. The index of the low stress is that at 5% elongation, the CD-strength is 0.1 N/5 cm width or less, preferably 0.100 N/5 cm width or less, more preferably 0.050 N/5 cm width or less and particularly preferably 0.010 N/5 cm width or less, and the MD/CD strength ratio is 200 or more, preferably 300 or more, and more preferably 400 or more. The upper limit of the MD/CD strength ratio is not given, because the CD-strength may be lower than the detection limit (0.001 N/5 cm) of the drawing tester. Nevertheless, in consideration that the maximum of the MD-strength in the examples of this invention is about 100 N/5 cm, the upper limit of the MD/CD strength ratio can be estimated to be about 100,000. If the MD-strength is higher, possibly assumed to be about 200 N/5 cm, the upper limit of the MD/CD strength ratio can be estimated to be about 200,000. To further explain the effect of this invention, at 50% elongation, the CD-strength is 5 N/5 cm width or less, preferably 5.000 N/5 cm width or less, more preferably 3.000 N/5 cm width and particularly preferably 1.000 N/5 cm width. The lower limit is the detection limit (0.001N/5 cm) of the drawing tester.

The combination of resin components of the conjugate spunbonded nonwoven fabric of conjugate fibers is described as follows. The conjugate spunbonded nonwoven fabric used in this invention comprises conjugate fibers including two resin components with a melting-point difference, wherein the two resin components include a low-melting point component, and a high-melting point component having a melting point higher than the melting point of the low-melting point component. The melting-point difference between the low-melting point component and the high-melting point component is preferably 10° C. or more. For the low-mp and high-mp components, for example, polyethylene (PE), polypropylene (PP), polyester (such as PET), and nylon, which are ordinary thermoplastic resins, can be used in combination. The PE may be high-density PE, low-density PE, or linear low-density PE. The conjugate fiber may be in the form of a sheath-core conjugate fiber where the sheath has a low-mp component and the core has a high-mp component, or in a conjugate form where a portion of the high-mp component is exposed at 50% or less of the surface area of the fiber surface. When the fiber consists of a single component, the processing condition of the thermo-compression bonding must be vigorous for a MD-strength sustaining the stretching, so that the fibrous structure of the fibers in the thermocompression bonded portions does not remain to an extent such that the thermal shrinkability of the same remains. Thus, the nonwoven fabric of this invention is difficult to obtain. This also applies to the case of a sheath-core conjugate fiber where the core includes a low-mp component and the sheath includes a high-mp one. Specific thermoplastic resin combinations for the conjugate spunbonded nonwoven fabric of this invention are, in terms of the low-mp/high-mp component, PE/PP, PE/nylon, PE/PET, PP/nylon, PP/PET, and preferably nylon/PET. To retain residual fibrous structures of the fibers in the thermocompression bonded portions to an extent such that the thermal shrinkability of the same remains, the larger the difference between the melting points of the two components, the less the limitations to the processing condition. Hence, the particularly preferable combination is PE/PET.

This invention further features that the total area of the thermocompression bonded portions takes preferably 7-60%, particularly preferably 10-50%, of the area of the raw-material nonwoven fabric before the folded structures are formed. When the proportion of the total area is within the above range, the area of thermocompression bonded portions for forming the fine folded structures is ensured to be sufficient without reducing the softness and the gas-permeability of the nonwoven fabric.

Moreover, for the raw-material nonwoven fabric used in this invention, the thermocompression bonded portions consecutively distributed in the MD preferably have an occupation ratio of 50% or more, more preferably 70% or more, relative to the full CD-width. The occupation ratio, called "CD-occupation ratio" hereafter, is further explained below.

The CD-occupation ratio of the raw-material nonwoven fabric used in this invention varies with the pattern of the thermocompression bonded portions of the same and relates to the effect of this invention. Hence, the pattern of the thermocompression bonded portions is described first.

Figure 2A:
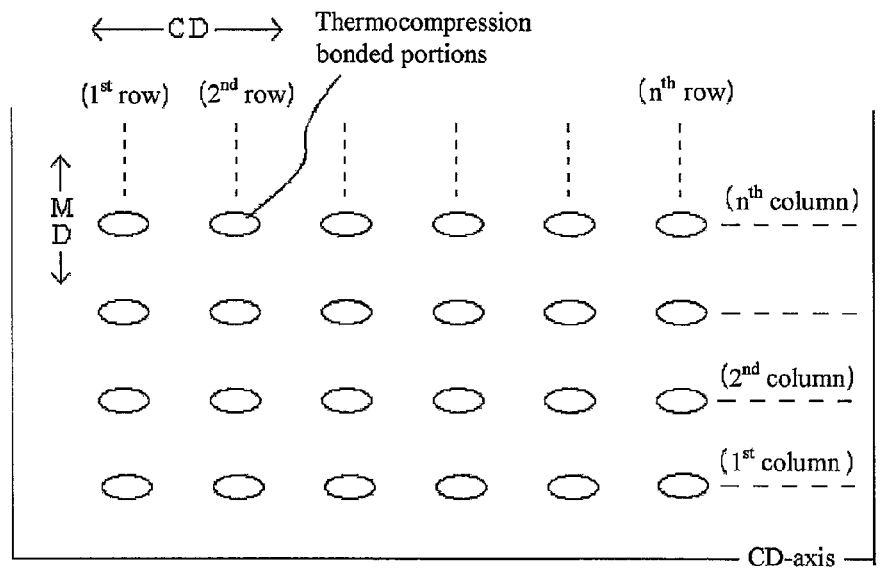
FIGS. 2(A)-2(B) illustrate an example (go-board arrangement structure with a linear arrangement along the MD and CD of the nonwoven fabric) of the pattern of the thermocompression bonded portions of the spunbonded raw-material nonwoven fabric used in this invention, and the CD-occupation ratio in the example.
Figure 2B:
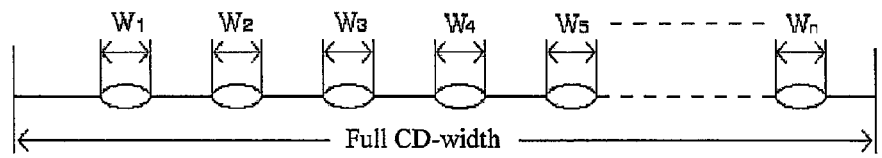

The pattern of thermocompression bonded portions in FIG. 2(A) has a go-board arrangement, wherein the CD-columns each including a column of thermocompression bonded portions arranged in the CD are perpendicular to the MD-rows each including a row of thermocompression bonded portions arranged in the MD. The CD-columns are arranged in a constant interval, so are the MD-rows. The interval of the CD-columns may be the same as or different from that of the MD-rows. The CD-occupation ratio can be derived by projecting all the thermocompression bonded portions to the CD-axis. Since the CD-axis is parallel to the CD-columns, the CD-occupation ratio of the pattern in FIG. 2(A) is equal to the proportion of the sum of the widths ($W_1$ to $W_n$) of the thermocompression bonded portions disposed in one CD-column in the full CD-width.

Figure 3A:
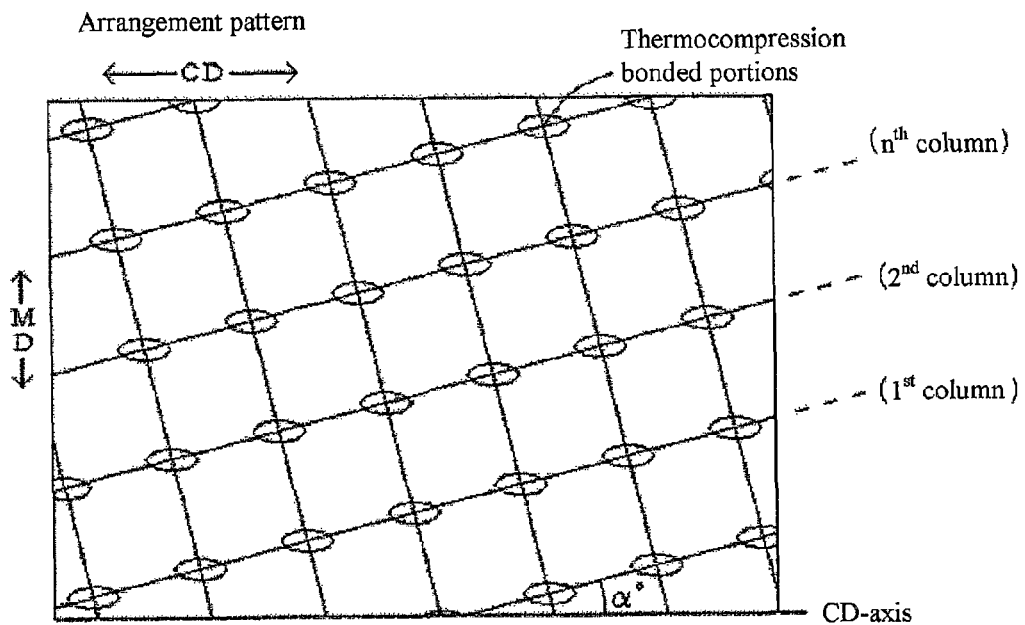
FIGS. 3(A)-3(C) illustrate another example (go-board arrangement rotated by α°) of the pattern of thermocompression bonded portions of the spunbonded raw-material nonwoven fabric used in this invention, and the CD-occupation ratio in the example.
Figure 3B:
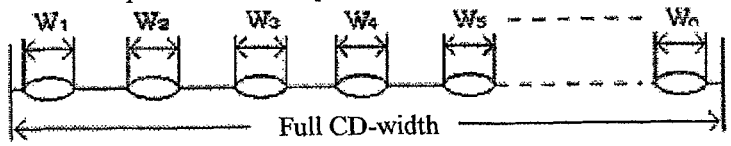

The pattern in FIG. 3(A) is made by rotating the pattern of thermocompression bonded portions in FIG. 2(A) by $\alpha°$, wherein each CD-column is deviated by $\alpha°$ from the real CD. In such a case, as shown in FIG. 3(B), the CD-occupation ratio of one CD-column is the proportion of the sum of the CD-axis projected widths ($W_1$ to $W_n$) of the thermocompression bonded portions in the one CD-column in the full CD-width.

Figure 3C:
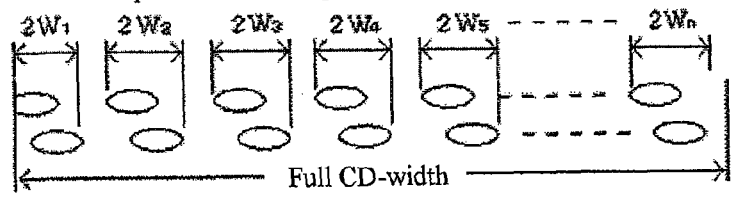

However, since the pattern has a tilt angle, the CD-occupation ratio of two CD-columns is the proportion of the sum of $2W_1$ to $2W_n$ as shown in FIG. 3(C) in the full CD-width. In fact, since the $1^{st}$ CD-column, the $2^{nd}$ CD-column, the $3^{rd}$ CD-column . . . are regularly and gradually deviated in the CD-position, the CD-occupation ratio of multiple CD-columns as being projected on the CD-axis is 100%.

Figure 4A:
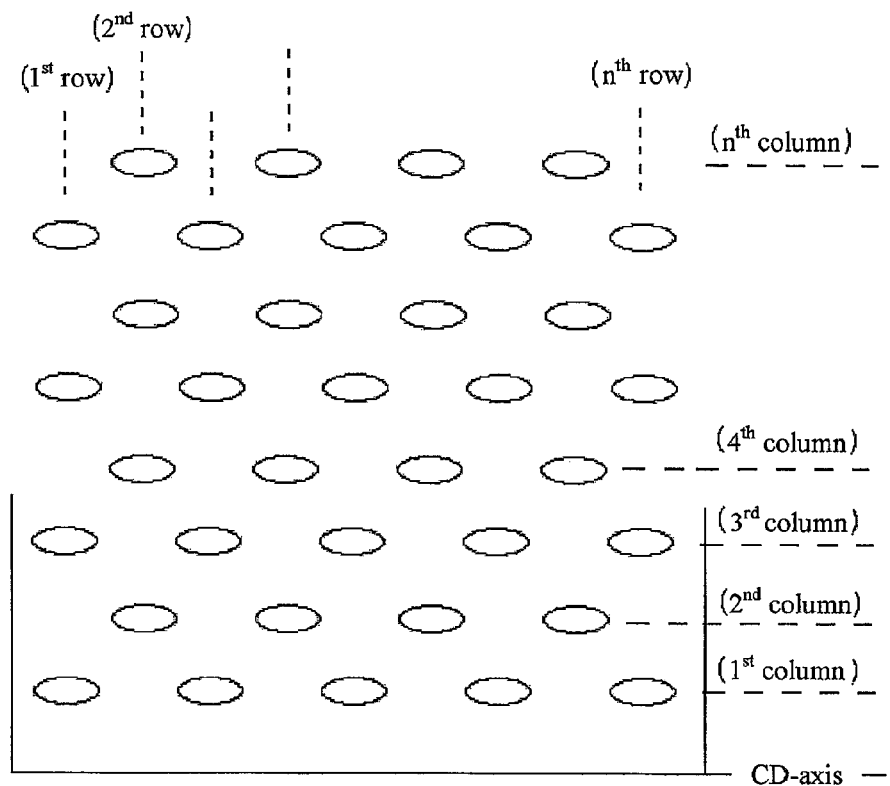
FIGS. 4(A)-4(B) illustrate still another example (alternate arrangement; zig-zag arrangement) of the pattern of the thermocompression bonded portions of the spunbonded raw-material nonwoven fabric used in this invention, and the CD-occupation ratio in the example.
Figure 4B:
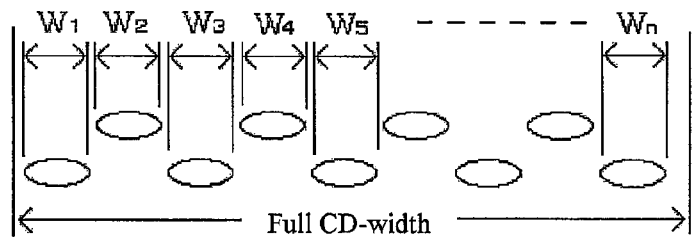

FIG. 4(A) illustrates an example of alternate arrangement for the pattern of the thermocompression bonded portions, in which the thermocompression bonded portions of the respective CD-columns are arranged alternately. The CD-columns are arranged in a constant interval, so are the MD-rows, and the thermocompression bonded portions are arranged with two consecutive columns or rows as a repeating unit. Moreover, the interval of the CD-columns may be the same as or different from that of the MD-rows. As for the CD-occupation ratio of the pattern in FIG. 4(A), since the CD-axis is parallel with the CD-columns, the CD-occupation ratio of two consecutive CD-columns is the proportion of the sum of the CD-axis projected widths ($W_1$ to $W_n$) of the thermo-compression bonded portions in the two CD-columns in the full CD-width, as shown in FIG. 4(B).

Though not shown in the figure, the pattern of the alternate arrangement may similarly be rotated by $\alpha°$, as in the case of the go-board arrangement shown in FIG. 3. In such a case, the pairs of two consecutive CD-columns are regularly and gradually deviated in the CD-position, and the CD-occupation ratio of multiple CD-columns as being projected on the CD-axis is also 100%.

Moreover, when the interval of the CD-columns is the same as that of the MD-rows in the cases of FIGS. 3(A) & 4(A), since the tetragons formed by the CD-columns and the MD-rows are squares, the pattern of FIG. 3(A) is similar to that of FIG. 4(A) after being rotated by 45°, and the pattern of FIG. 4(A) is similar to that of FIG. 3(A) after being rotated by 45°.

Figure 5A:
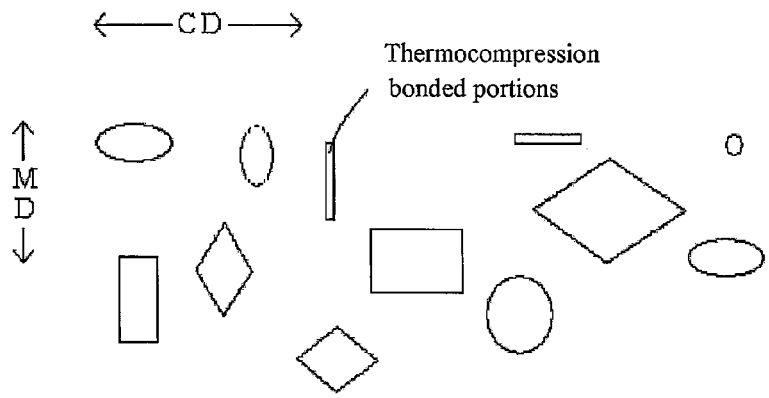
FIGS. 5(A)-5(B) illustrate yet another example (random arrangement) of the pattern of the thermocompression bonded portions of the spunbonded raw-material nonwoven fabric used in this invention, and the CD-occupation ratio in the example.
Figure 5B:
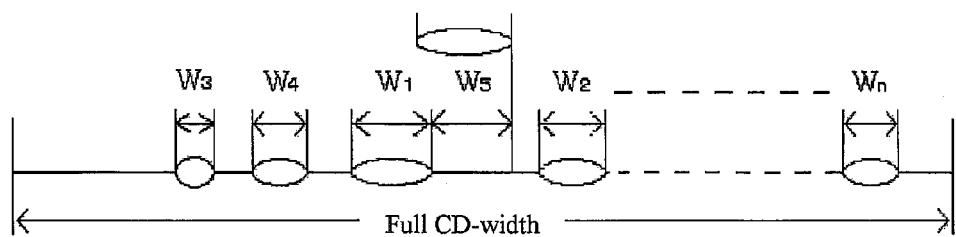

FIG. 5(A) illustrates an example of random shapes and arrangement for the thermocompression bonded portions. In such a case, as shown in FIG. 5(B), the CD-occupation ratio is the proportion of the sum of $W_1$ to $W_n$ in the full CD-width, wherein the projected widths of the bonded portions arranged from near the bottom of FIG. 5(A) and one by one projected on the CD-axis are $W_1, W_2, W_3 \ldots W_n$.

Moreover, even after being rotated by $\alpha°$, the CD-occupation ratio of the pattern of FIG. 5(A) can be derived in the same way since the pattern originally has a random arrangement.

Moreover, the raw-material nonwoven fabric used in this invention preferably has a dry-heat shrinkage ratio of 3.5-23%, particularly preferably 4-20%. The thermal shrinkage of the fibers is important for forming the fine folded structures. Particularly, the shrinkage ratio of the fiber of the high-nip component remaining in the thermo-compression bonded portions has to be kept in a suitable range. When the dry-heat shrinkage ratio is 3.5-23%, folded structures are easy to form and the distance between the hills thereof can be kept at 400 µm or less, and this invention can be accomplished without considering the occurrence of local tension or dense portions (lumps) on the nonwoven fabric that is fabricated. In addition, the formation of the nonwoven fabric can also maintain good.

To obtain a nonwoven fabric with the above MD dry-heat shrinkage ratio, it is important to properly set the spinning conditions including the spinning speed and the spinning temperature. The spinning conditions can be easily set in accordance with slight inhibition of the crystallinity or molecular alignment of the high-mp component. For example, with the combination of PE/PET, a raw-material nonwoven fabric having a MD dry-heat shrinkage ratio of 3.5-23% can be preferably obtained by setting the spinning speed to 2000-3000 m/min and the spinning temperature to 300-350° C.

Regarding the width reduction of the nonwoven fabric obtained by moderately stretching the above-mentioned suitable raw-material nonwoven fabric, the ratio of the post-stretching CD-width to the pre-stretching CD-width is preferably 0.1-0.7, more preferably 0.2-0.6. When the ratio is 0.1-0.7, the low-stress stretchability as defined in this invention can be kept sufficient, and, as in the case of the MD dry-heat shrinkage ratio, this invention can be accomplished without considering the occurrence of local tension or dense portions (lumps) on the nonwoven fabric that is fabricated. In addition, the formation of the nonwoven fabric can also be kept good.

In this invention, the conditions of the thermocompression bonding process for forming the thermocompression bonded portions of the raw-material nonwoven fabric are not particularly limited; however, it is important to set the conditions such that the fibrous structure of the high-mp component remains in the thermocompression bonded portions. If only the processing conditions allow the high-mp component to retain the fibrous shape in the thermocompression bonded portions, it is acceptable that the low-mp component is made as an integral over the entire thermocompression bonded portion through thermal melting. To retain the fibrous structure of the high-mp component, it is particularly important to properly set respective conditions of the thermocompression bonding process, including the temperature and line pressure. Such bonding may utilize a known method, which is represented by the one using a thermal embossing roll with concave and convex portions that is usually used in the art. The thermocompression bonding conditions (temperature and line pressure, etc.) of the above thermal embossing roll for forming thermocompression bonded portions vary with the type of the resin used. Nevertheless, by simultaneously observing the states of the thermocompression bonded portions in the bonding process, the condition can be easily set in a range usually adopted in the art.

For example, when a spunbonded nonwoven fabric as a raw-material including the combination of PE/PET or PE/PP is to be made using, e.g., the thermocompression bonding machine using an embossing/swimming roll manufactured by Kuster Company, it is desired to set the roll temperature to 115-140° C. and the line pressure to 20-70 N/mm.

Moreover, the stretching condition is either not particularly limited in this invention. The "stretching" means the stretching of the raw-material nonwoven fabric in the MD only, and can be conducted using a roll stretching device or a pin tentering stretching device. Since the width of the post-stretching nonwoven fabric is reduced to 0.1 to 0.7 time that of the pre-stretching raw-material nonwoven fabric, a device without resistance to the width reduction is desired. When a roll stretching device is used, the width can be reduced to the predetermined value by adjusting the distance between the feeding roll and the drawing roll. When a pin tentering stretching device is used, the pin tentering part is adjusted such that stretching is conducted and the width is reduced to a predetermined value.

Moreover, the stretching conditions including temperature, stretching factor, and so on that make the thermocompression bonded portions exhibit fine folded structures are described.

The heating in the roll stretching may utilize any one of an ordinary heating roll, dry hot air provided between the feeding roll and the drawing roll, steam, a hot-water chamber and a heated-steam chamber, or a combination thereof. The heating in the pin tentering stretching may utilize dry hot air or far infrared ray.

Regarding the stretching temperature, it is desired that the stretching is done at a temperature at which the low-mp component as the sheath component of the raw-material nonwoven fabric is not melted and the low-mp component and high-mp component are plasticized and subjected to moderate thermal shrinkage. For example, for a nonwoven fabric with the combination of PE/PET, the stretching temperature is preferably 50-120° C. in consideration of the plasticizing temperature and the melting point of PE as the low-mp component as well as the plasticizing temperature of PET as the high-mp component, and is more preferably 80-100° C. to ensure the stretchability and stabilize the texture and the physical property (such as low-stress stretchability) of the nonwoven fabric.

Regarding the stretching ratio, it is desired to set a proper value such that the conjugate fibers in the non-thermocompression bonded portions are aligned in the MD and not broken even with further stretching, and the thermocompression bonded portions of the raw-material nonwoven fabric are not damaged. To generate the fine folded structures as mentioned in this invention in the thermocompression bonded portions, the larger the stretching ratio is in the range not causing breaking or damage, the larger the counteraction stress in the CD is, and the better the stretching effect is. For example, for a raw-material nonwoven fabric including the combination of PE/PET, the stretching ratio varies with the proportion of the areas of the thermocompression bonded portions, the fiber diameters and the basis weight of the raw-material nonwoven fabric and the stretching temperature, and may range from 1.3 to 2.0.

Examples of the stretchable layer used in this invention include: a web including fibers of an elastomeric resin or including a composite component containing an elastomeric resin, a nonwoven fabric, a film, and a layer having stretchability due to the structural feature of a laminate, such as a web made from crimped fibers, dry nonwoven fabric, spunlace nonwoven fabric, network-like weave, and knitwear. Among them, the fiber of an elastomeric resin or the spunbonded fibers made from a composite component containing an elastomeric resin, and the fiber layer and film constituted of meltblown fibers easily develop high stretchability. To obtain a good stretchability for the laminate, the elongation recovery ratio at 80% elongation is preferably 60% or more, particularly preferably 75% or more. The stretchable layer preferably contains an elastomeric resin as a constituent component, which preferably takes 20 wt % or more of the stretchable layer. When the stretchable layer is a layer of fibers, to improve the elongation recovery ratio, the constituent fiber is preferably a continuous fiber, such as spunbonded fiber or flash fiber, meltblown fiber, electrospun fiber and so on, wherein the meltblown fiber is preferred in consideration of the difficulty or cost of the fiber production. The fiber may consist of a single component or include a resin mixture containing two or more resin components, wherein the conjugate fiber may have a cross section with respective domains of the two or more components. The conjugate form of the conjugate fiber is not limited, possibly being a sheath-core form or an eccentric sheath-core form, a parallel form, a pie segment form, a hollow sheath-core form or a hollow pie segment form, etc. In addition, it is feasible to mix these fibers to form mixed fibers for use.

Examples of the elastomeric resin include polystyrene elastomer, polyolefin elastomer, polyester elastomer, polyamide elastomer and polyurethane elastomer, wherein polystyrene elastomer, polyolefin elastomer, polyester elastomer and polyamide elastomer are preferred in consideration of the ease in the recycling.

When the stretchable layer includes fibers containing an elastomeric resin, the elastomeric resin preferably takes 20 wt % or more, more preferably 50 wt % or more, of the stretchable layer. Examples of the resins other than elastomeric resins include nonelastomeric resins such as polypropylene, polyethylene, polyester, polyamide, polypropylene-series copolymers, polyethylene-series copolymers, and polyester-series copolymers. The nonelastomeric resin may be included in the fibers as a constituent component mixed with an elastomeric resin to form a conjugate fiber, or may be a resin component forming a kind of fiber among multiple kinds of mixed fibers. Particularly, by mixing an elastomeric fiber and a nonelastomeric fiber, the texture or stretchability can be adjusted as required by adjusting the mixed amounts and the fiber diameters of the respective fibers. Moreover, by mixing different kinds of elastomeric resins, the texture or stretchability can be adjusted at a higher level of stretchability. Examples of combinations of different kinds of elastomeric resins include: two kinds of polystyrene elastomers, polystyrene elastomer and polyolefin elastomer, polystyrene elastomer and polyester elastomer, polystyrene elastomer and polyamide elastomer, polystyrene elastomer and polyurethane elastomer, two kinds of polyolefin elastomers, polyolefin elastomer and polyester elastomer, polyolefin elastomer and polyamide elastomer, polyolefin elastomer and polyurethane elastomer, two kinds of polyester elastomers, polyester elastomer and polyamide elastomer, polyester elastomer and polyurethane elastomer, two kinds of polyamide elastomers, polyamide elastomer and polyurethane elastomer, and two kinds of polyurethane elastomers.

Figure 6:
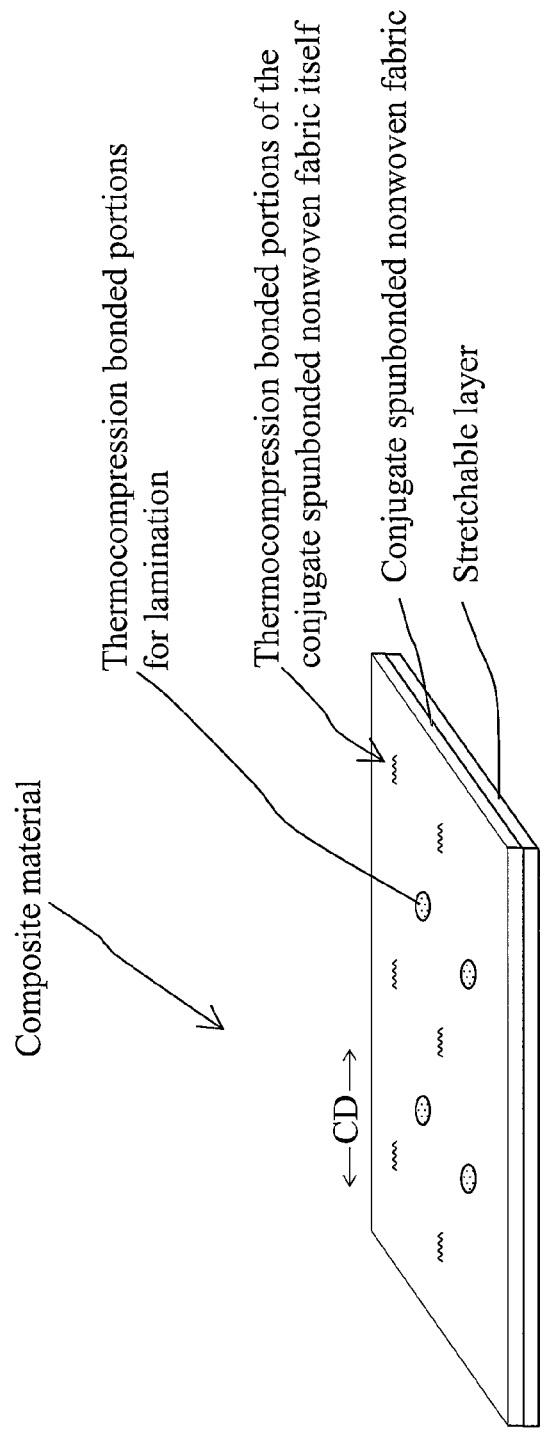
FIG. 6 illustrates an embodiment of a composite material of this invention that is made by laminating a conjugate spunbonded nonwoven fabric and a stretchable layer as an integral.

The composite material of this invention is made by steps comprising laminating at least one conjugate spunbonded nonwoven fabric and at least one stretchable layer as an integral, as shown in FIG. 6. Further, if only the aforementioned effects of this invention are not hindered, one or more other layers can be further laminated. The layers can be laminated in an alternate manner or in arbitrary order. In a preferred embodiment of the composite material of this invention, two conjugate spunbonded nonwoven fabrics are laminated on both surfaces of a stretchable layer acting as a middle layer.

The lamination method is not particularly limited, possibly being a pressing method, thermocompression bonding, hot-air through bonding, ultrasonic bonding, adhesive bonding, hot melt resin bonding and so on. To effectively develop the low-stress stretchability as defined in this invention, the preferred methods are those less liable to damage the folded structures of the conjugate spunbonded nonwoven fabric, including partial thermocompression bonding, ultrasonic bonding, and hot melt bonding.

In consideration of easy development in softness and the relatively low fabrication cost, partial thermocompression bonding is preferred, of which the preferred processing conditions are as follows. Though the setting of the temperature depends on the material used, the temperature is preferably set such that the conjugate spunbonded nonwoven fabric does not easily peel off from the stretchable layer and the partial thermocompression bonding is not damaged even if the composite material of this invention is repeatedly elongated and recovered. The pressure in the partial thermocompression bonding process is preferably 10-100 N/mm. The ratio of the area of the compress-bonded portions is preferably 4-12%. The pitch of the partial thermocompression bonded portions in the CD, i.e., the distance between the CD-projections of neighboring partial thermocompression bonded portions of the composite material of this invention, is preferably 0.6 mm or more. The shape of a partial thermocompression bonded portion is not particularly limited, and may be a circular shape, an elliptic shape, a square shape, a rectangular shape or a corner-rounded rectangular shape. The pattern of the thermocompression bonding in the forming process of the composite material is not particularly limited, if only it is not entirely the same as that of the previous thermocompression bonding performed to the spunbonded nonwoven fabric, as shown in FIG. 6. Nevertheless, the more inconsistent their patterns are, the better the effect is.

Moreover, as the stretchable layer is a meltblown nonwoven fabric, it is possible to directly laminate the meltblown fibers obtained from an elastomeric resin on the conjugate spunbonded nonwoven fabric of this invention as an integral in the forming process of the meltblown nonwoven fabric. After the lamination, the composite material of this invention can be stretched in at least one direction. After the stretching, the conjugate spunbonded nonwoven fabric cannot follow the elongation recovery of the stretchable layer between the thermocompression bonded sites, so that protrudent surface structures can also be formed on the surface side of the conjugate spunbonded nonwoven fabric. Such structures are preferred as improving the thickness feel, providing the touch closer to that of the cloth, and improving the design feel.

The production equipment of this invention includes a production line of the raw-material nonwoven fabric and a line for stretching the nonwoven fabric, and may further include a lamination line. The lines may be all separate from each other to form an off-line configuration or be all connected to form an in-line configuration. It is also possible to set two of the three lines to be in-line and the rest to be off-line.

In addition, the conjugate spunbonded nonwoven fabric used in this invention further features that the MD-strength at 5% elongation is almost the same as that of the raw-material nonwoven fabric. Hence, during the processing of the laminate or article, it is possible to perform the operation without damaging the fine folded structures formed in the CD if the laminate or article is repeatedly delivered in the MD.

EXAMPLES

The invention is further explained with the following Examples and Comparative Examples. The measurement methods and evaluation methods used in the Examples and Comparative Examples are described as follows.

(1) Tensile Strength at 5% Elongation

The measurement is according to the tensile strength testing method described in JIS (Japanese Industrial Standard) L-1906 *"Testing methods for ordinary long-fiber nonwoven fabric"*, using a drawing tester with an autograph device. The MD-strength and the CD-strength are measured when the test sheet of 100 mm in length is elongated by 5 mm in the MD or CD.

(2) Tensile Strength at 50% Elongation

The measurement method is similar to the above except that the test sheet is elongated by 50 mm.

(3) Dry-Heat Shrinkage Ratio

The dry-heat shrinkage ratio in the MD is measured according to the testing method for dry-heat shrinkage ratio described in JIS L-1906 *"The testing methods for ordinary long-fiber nonwoven fabric"*.

(4) Distance Between Neighboring Hills of the Fine Folded Structures in the Thermocompression Bonded Portions The digital microscope VHX-900 made by the Keyence Corporation was used to shoot, in a magnification factor of 200, twenty thermobonded sites randomly selected from the nonwoven fabric. The respective inter-hill distances of the twenty thermobonded sites were measured respectively, and their average value was calculated.

Example 1

A conjugate spunbonded nonwoven fabric is prepared, wherein a high-density polyethylene with a melting point of 129°, a density of 0.958 g/cm³ and a melt mass flow rate of 38 dg/min (190° C.) is contained at the sheath side, and a polyester with an intrinsic viscosity of 0.640 and a melting point of 254° C. is contained at the core side. The spinning speed is 2075 m/min, the spinning temperature of the polyethylene is 240° C. and that of the polyester is 320° C., and the line pressure and temperature for the thermocompression bonding are 45 N/mm and 125° C., respectively. The resulting conjugate spunbonded nonwoven fabric has a CD-width of 1100 mm, a basis weight of 17 g/m², an area ratio of 21% for the total area of the thermocompression bonded portions, and a CD-occupation ratio of 90%. The conjugate spunbonded nonwoven fabric is passed through an apparatus equipped with a steam chamber between heating rolls at a speed of about 20 m/min, and is stretched by 1.5 times in the MD, wherein the temperatures of the rolls and the steam are both 100° C. The conjugate spunbonded nonwoven fabric has a CD-width of 572 mm and a basis weight of 32 g/m² after the stretching, is soft, and is quite rich in the CD-stretchability. The physical properties thereof are described as follows:

Inter-hill distance of fine folded structures in thermocompression bonded portions:
233 µm
Tensile strength at 5% elongation:
MD: 42.8 N/5 cm
CD: 0.089 N/5 cm
MD/CD ratio: 481
Tensile strength at 50% elongation:
MD: broken
CD: 2.89 N/5 cm
CD-width ratio
Post-stretching/pre-stretching: 0.52.

It was known from the result that the nonwoven fabric obtained exhibited fine folded structures in the thermocompression bonded portions and thus had CD-tensile strengths respectively at 5% elongation and at 50% elongation much lower than those of the raw-material nonwoven fabric, i.e., acquired a low-stress stretchability.

On the conjugate spunbonded nonwoven fabric exhibiting fine folded structures in the thermocompression bonded portions, a fiber formed from a hydrogenated styrene-series thermoplastic elastomer (Tuftec H1031 produced by Asahi Kasei Chemicals) as a styrene elastomer and a fiber from an ethylene-octene random copolymer (Engage 8402 produced by Dow Chemicals) as a polyethylene elastomer were mix-spun, using a fiber-mixing spinning nozzle, into a nonwoven fabric to fabricate a fiber-mixing meltblown nonwoven fabric. Thus, a composite material of a conjugate spunbonded nonwoven fabric and a fiber-mixing meltblown nonwoven fabric was formed. The average diameter of the fiber of H1031 was 10 µm, and that of the fiber of Engage 8402 was 11 µm. The fiber mixing ratio in weight was 50%:50%. The basis weight of the fiber-mixing meltblown nonwoven fabric was 29 g/m². In the fabrication of the fiber-mixing meltblown non-woven fabric, the spinning temperature was 250° C., the temperature of the hot air was 400° C., and the pressure of the hot air was adjustable.

Then, on the fiber-mixing meltblown nonwoven fabric side of the composite material of the conjugate spunbonded nonwoven fabric and the fiber-mixing meltblown nonwoven fabric, another conjugate spunbonded nonwoven fabric exhibiting fine folded structures in the thermocompression bonded portions was laminated. The laminate was subject to an embossing treatment under 115° C., so that a tri-layer composite material of a conjugate spunbonded nonwoven fabric, a fiber-mixing meltblown nonwoven fabric and another conjugate spunbonded nonwoven fabric was obtained. In addition, the embossing roll had thereon many protrusions of 0.65 mm in diameter, which were alternately arranged in a MD-pitch of 2.8 mm and a CD-pitch of 2.84 mm, to form an embossing pattern with an area proportion of 8.3%. The tri-layer composite material of a conjugate spunbonded nonwoven fabric, a fiber-mixing meltblown nonwoven fabric and another conjugate spunbonded nonwoven fabric had a basis weight of 93 g/m² and the following physical properties:

CD-tensile strength at 80% elongation:
9.55 N/5 cm
Elongation recovery ratio after 80% elongation:
72%

The elongation recovery ratio after 80% elongation is measured using a drawing tester with an autograph device, wherein the test sheet having a gripping length of 100 mm was elongated by 80 mm and returned toward the gripping length of 100 mm, during which the length at which the stress became zero was recorded for the derivation.

Moreover, because the surface of the tri-layer composite material of the first conjugate spunbonded nonwoven fabric, the fiber-mixing meltblown nonwoven fabric and the second conjugate spunbonded nonwoven fabric has thereon protrudent surface structures when the embossed sites are considered as concave portions, it provides a good design feel and a cloth-like touch.

Reference Example 1

A raw-material nonwoven fabric was fabricated as in Example 1 except that the line pressure in the thermocompression bonding processing was changed to 25 N/mm, from which a nonwoven fabric with a post-stretching width of 274 mm and a basis weight of 56 g/m² was obtained. The physical properties of the same were as follows:

Inter-hill distance of fine folded structures in thermocompression bonded portions:
108 µm
Tensile strength at 5% elongation:
MD: 97.6 N/5 cm
CD: 0.002 N/5 cm
MD/CD ratio: 48800
Tensile strength at 50% elongation:
MD: broken
CD: 0.006 N/5 cm
CD-width ratio
Post-stretching/pre-stretching: 0.25.

Reference Example 2

A raw-material nonwoven fabric was fabricated as in Example 1 except that the core side contained a polypropylene having a melting point of 162° C., a density of 0.961 g/cm³, and a melt mass flow rate of 42 dg/min (230° C.), the spinning temperature was 240° C. and the line pressure and the temperature of the thermocompression bonding processing were 60 N/mm and 135° C., respectively. A nonwoven fabric with a post-stretching width of 318 mm and a basis weight of 38 g/m$^2$ was obtained from the raw-material nonwoven fabric, with the following physical properties:

Inter-hill distance of fine folded structures in thermocompression bonded portions:
  243 μm
Tensile strength at 5% elongation:
  MD: 19.1 N/5 cm
  CD: 0.084 N/5 cm
  MD/CD ratio: 227
Tensile strength at 50% elongation:
  MD: broken
  CD: 4.33 N/5 cm
CD-width ratio
Post-stretching/pre-stretching: 0.51.

Reference Example 3

A raw-material nonwoven fabric was fabricated as in Example 1 except that the total area of the thermocompression bonded portions occupied 10% of the area of the nonwoven fabric and the CD-occupation ratio was 54%, from which a nonwoven fabric with a post-stretching width of 421 mm and a basis weight of 28 g/m$^2$ was obtained. The physical properties of the same were as follows:

Inter-hill distance of fine folded structures in thermocompression bonded portions:
  122 μm
Tensile strength at 5% elongation:
  MD: 13.5 N/5 cm
  CD: 0.002 N/5 cm
  MD/CD ratio: 6750
Tensile strength at 50% elongation:
  MD: broken
  CD: 0.016 N/5 cm
CD-width ratio
Post-stretching/pre-stretching: 0.57.

Reference Example 4

A raw-material nonwoven fabric was fabricated as in Example 1 except that the total area of the thermocompression bonded portions occupied 47% of the area of the nonwoven fabric and the CD-occupation ratio was 100%, from which a nonwoven fabric with a post-stretching width of 205 mm and a basis weight of 32 g/m$^2$ was obtained. The physical properties of the same were as follows:

Inter-hill distance of fine folded structures in thermocompression bonded portions:
  136 μm
Tensile strength at 5% elongation:
  MD: 69.1 N/5 cm
  CD: 0.003 N/5 cm
  MD/CD ratio: 23033
Tensile strength at 50% elongation:
  MD: broken
  CD: 0.133 N/5 cm
CD-width ratio
Post-stretching/pre-stretching: 0.28.

Comparative Example 1

A single conjugate spunbonded nonwoven fabric that exhibited the fine folded structures in the thermocompression bonded portions as used in Example 1 was used alone in Comparative Example 1, of which the CD-tensile strength at 80% elongation and the elongation recovery ratio after 80% elongation were evaluated as follows:

CD-tensile strength at 80% elongation:
  2.48 N/5 cm
Elongation recovery ratio after 80% elongation:
  51%.

Accordingly, though the stretched conjugate spunbonded nonwoven fabric alone had a large elongation under a low stress, it had no good recovery capability after being elongated. However, by laminating a stretchable layer on the stretched conjugate spunbonded nonwoven fabric, not only a good elongation recovery was obtained but also the design feel and the touch after the elongation were superior.

INDUSTRIAL UTILITY

Since the conjugate spunbonded nonwoven fabric used in this invention is good in stretchability and softness, after being laminated with a stretchable layer, it is suitably applied to the following articles: stretchable members of dispensable diapers, stretchable members of diapers, stretchable members of sanitary products, stretchable members of sanitary materials such as the stretchable member of a diaper cover, stretchable tapes, adhesive plasters, stretchable members of clothing, interlining for clothing, insulating material or thermal insulating material for clothing, protective garments, caps, masks, gloves, supporters, elastic bandage, base cloth for poultice materials, base cloth for plaster materials, non-slip base cloth, vibration absorbents, fingerstalls, air filters for clean rooms, various filters such as blood filters and oil-water separation filters, electret filters having been subjected to electret processing, separators, heat insulating materials, coffee bags, food packing materials, various members of automobiles such as ceiling cover materials for automobiles, sound-proof materials, base materials, cushioning materials, dust-proof materials for speakers, air-cleaner materials, covers of insulators, backing materials, bonded nonwoven fabric sheets and door trims, various cleaning materials such as the cleaning materials of copy machine, front surface materials and back surface materials of carpets, rolled cloth for agriculture, draining materials for timbers, wood materials, members of shoes such as the covers of sports shoes, members of handbags, industrial sealing materials, wiping materials, sheets and so forth.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A composite material formed by a process comprising laminating a conjugate spunbonded nonwoven fabric and a stretchable layer as an integral, wherein the conjugate spunbonded nonwoven fabric comprises conjugate fibers in a sheath-core form where a sheath has a low-melting point component and a core has a high-melting point component, or in a conjugate form of the low-melting point component and the high-melting point component where a portion of the high-melting component is exposed at 50% or less of a surface area of the conjugate fiber, wherein the high-melting point component has a melting point higher than a melting point of the low-melting point component, the conjugate spunbonded nonwoven fabric has a plurality of thermocompression bonded portions that are formed by a first partial thermocompression bonding process and are consecutively distributed in a length direction (machine direction, MD) thereof, wherein each of the thermocompression bonded portions includes fine folded structures including alternate hill regions and valley regions in a width direction (cross direction, CD) in fabrication of the conjugate spunbonded nonwoven fabric, a distance between neighboring hill regions is 100-400 μm in average, the conjugate spunbonded nonwoven fabric exhibits stretchability through spreading of the fine folded structures, and the conjugate spunbonded nonwoven fabric and the stretchable layer are laminated as an integral by a second partial thermocompression bonding process, wherein an area ratio of a plurality of compression-bonded portions is 4-12%, and a pattern of the compression-bonded portions is not entirely the same as a pattern of the thermocompression bonded portions of the conjugate spunbonded nonwoven fabric.

2. The composite material of claim 1, wherein the conjugate spunbonded nonwoven fabric has, at 5% elongation, a CD-strength of 0.1 N/5 cm or less, and an MD/CD strength ratio of 200 or more as a ratio of a strength in the length direction (machine direction, MD) in the fabrication of the conjugate spunbonded nonwoven fabric to the CD-strength.

3. The composite material of claim 1, wherein the conjugate spunbonded nonwoven fabric has a CD-strength of 5 N/5 cm or less at 50% elongation.

4. The composite material of claim 1, wherein the stretchable layer comprises a layer of continuous fibers that comprises an elastomeric resin.

5. The composite material of claim 4, wherein the layer of continuous fibers comprises a layer of meltblown fibers.

6. The composite material of claim 1, wherein an elongation recovery ratio of the stretchable layer at 80% elongation is 60% or more.

7. The composite material of claim 1, wherein in the conjugate spunbonded nonwoven fabric, the low-melting point component comprises polyethylene and the high-melting point component comprises polyester.

8. The composite material of claim 1, wherein a distance between CD-projections of neighboring compression-bonded portions of the composite material is 0.6 mm or more.

* * * * *